ADD# UNITED STATES PATENT OFFICE.

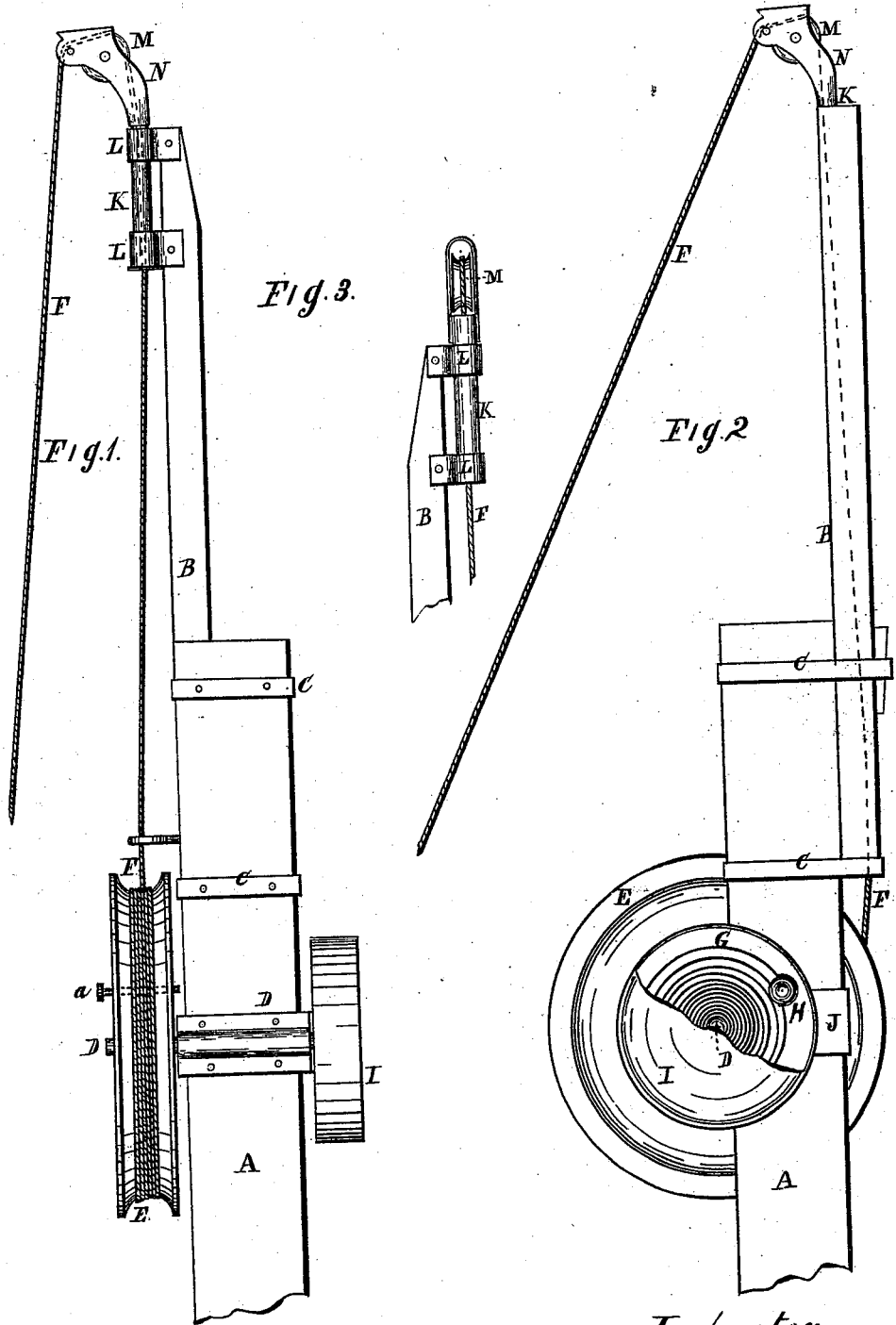

RICHARD WARLOW, OF CLEVELAND, OHIO.

IMPROVEMENT IN TETHERS.

Specification forming part of Letters Patent No. 209,783, dated November 12, 1878; application filed July 29, 1878.

*To all whom it may concern:*

Be it known that I, RICHARD WARLOW, of Cleveland, in the county of Cuyahoga and State of Ohio, have invented new and useful Improvements in Tethers, of which the following is a description, reference being had to the accompanying drawings, making a part of this specification, in which—

Figures 1 and 2 are side views of the tether in different positions. Fig. 3 is a detached section.

Like letters of reference refer to like parts in the several views presented.

The nature of my invention in tethers relates to the mode of allowing the tether-line to move around with the animal secured to the line without becoming entangled therewith, and at the same time the slack of the rope or line is taken up by a volute spring. The entanglement referred to is avoided by means of a hollow rotating spindle, through which the tether-line passes, thence to a pulley connected with the said spindle, over which it runs from the spindle, and from the spindle it extends to a drum or wheel, whereon it is wound, and from which it is drawn by the animal as it recedes from the tether. The slack of the line is taken up by the recoil of a volute spring, acting in connection with the said wheel.

For a more full and complete description of said invention, reference will be had to the following specification and to the accompanying drawings.

The tether consists of the main post A, which may be secured to the ground by any suitable means. To the post is attached the shaft B by straps or bands C C, or otherwise, as may be found convenient. From the ground to the top of the shaft B may be some six feet, more or less, according to circumstances. To the post A is hung the shaft D in a box or bearing, to one end of which is secured the wheel E, upon which is wound the tether-line F, as seen in Fig. 1. On the opposite end of the shaft is secured the volute spring G by its inner end.

The outer end of the spring is attached to a pin or wrist, H, Fig. 2, which secures it to the inside of the case I, in which the spring is inclosed. The case is stationary, and is fastened to the post by a strap, J, or by other suitable means. Said strap also aids in securing the journal-box of the shaft D to said post.

If desired, the wheel E may be inclosed with the spring in one case or box. To the top of the shaft B is attached the hollow spindle K by straps having loops L, in which the said spindle is held so as to revolve in the loops.

The upper end of the spindle is bifurcated to receive the sheave or pulley M, in which it is journaled at N.

Having described the construction of the tether, the operation thereof will now be referred to.

One end of the line is made fast to the pulley or wheel E, and the other end passes up through the spindle K, and thence over the sheave M, from which it extends to the animal to be tethered. At the outer end of the line may be attached a swivel-joint hook, to prevent knotting and fouling of the line by the movements of the animal, and as the animal moves around the tether-post more or less distant from it the spindle will so turn with the animal as to prevent the line from twisting or coiling about the tether-post. The circuit of the animal about the tether causes the spindle to turn in the same direction by the action of the line F upon the head of the spindle, through which it passes, as shown in Fig. 3. By passing the line through the spindle it is prevented from slipping and from being drawn out of place in the head; hence the line will at all times be held above the post and shaft, and allowed to turn with the head in the circuit of the animal. As the animal recedes from the post the line is drawn out more or less from the unwinding of the line from the wheel.

The turning of the wheel E in uncoiling the line causes the spring G to coil up, thereby increasing the tension of the line. Now, as the animal approaches the tether or the line slackens, the recoil of the spring follows and turns the wheel in a reverse direction, so as to take up the slack in the line. Thus as the animal moves from the tether the line unwinds from the wheel as it turns, and this rotation of the wheel coils up the spring G, and as soon as there is any slack in the line the recoil of the spring acts upon the wheel to rotate it and wind up the slack. By this means the line is at all times at the proper tension, and is prevented from being entangled with the animal or fouling with the tether.

To prevent more line from leaving the wheel than is required for a certain range of the animal, a pin, $a$, Fig. 1, is passed through the rim of the wheel, outside of the line thereon, which will prevent the unwinding of the line beyond that point. In the event of more line being needed, the pin is removed and so much of the line unwound as is wanted. The pin is then inserted in the wheel to stay a further unwinding of the line.

What I claim as my invention, and desire to secure by Letters Patent, is—

1. In tethers, an improvement consisting of the rotating tubular spindle, provided with a sheave, and hung to the shaft or post of the tether, arranged to admit of the line passing through the tube of the spindle and over the sheave, and operating conjointly with the wheel E, spring G, and pulley M, substantially as and for the purpose set forth.

2. In tethers, the tubular rotating spindle K and sheave M, in combination with the line F, wheel E, shaft D, and spring G, substantially as described, and for the purpose set forth.

RICHARD WARLOW.

Witnesses:
  JOHN H. BURRIDGE,
  E. R. TAYLOR.